(12) United States Patent
Taira

(10) Patent No.: US 6,718,777 B1
(45) Date of Patent: Apr. 13, 2004

(54) REFRIGERATING APPARATUS

(75) Inventor: Shigeharu Taira, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/169,152

(22) PCT Filed: Nov. 20, 2000

(86) PCT No.: PCT/JP00/08140

§ 371 (c)(1), (2), (4) Date: Jun. 28, 2002

(87) PCT Pub. No.: WO01/48126

PCT Pub. Date: Jul. 5, 2001

(30) Foreign Application Priority Data

Dec. 28, 1999 (JP) .......................................... 11/373447

(51) Int. Cl.$^7$ ................................................. F25B 1/00
(52) U.S. Cl. ........................................... 62/114; 252/68
(58) Field of Search .............................. 62/114, 115, 122, 62/468, 498, 502; 252/67, 68

(56) References Cited

U.S. PATENT DOCUMENTS

| | | | | |
|---|---|---|---|---|
| 5,669,232 A | * | 9/1997 | Iwamoto et al. | 62/296 |
| 5,941,084 A | * | 8/1999 | Sumida et al. | 62/129 |
| 6,044,660 A | * | 4/2000 | Numoto et al. | 62/468 |
| 6,261,474 B1 | * | 7/2001 | Egawa et al. | 252/68 |
| 6,454,960 B1 | * | 9/2002 | Sunaga et al. | 252/67 |

FOREIGN PATENT DOCUMENTS

| | | |
|---|---|---|
| EP | 0 644 174 A1 | 3/1995 |
| EP | 0 821 046 A1 | 1/1998 |
| EP | 0 890 627 A1 | 1/1999 |
| EP | 1 063 272 A1 | 12/2000 |
| EP | 1 085 077 A1 | 3/2001 |
| JP | 5-248715 A | 9/1993 |
| JP | 6-128578 A | 5/1994 |
| JP | 10-147682 A | 6/1998 |
| JP | 11-80718 A | 3/1999 |
| JP | 11-181466 A | 7/1999 |
| JP | 11-315295 A | 11/1999 |
| JP | 11-323369 A | 11/1999 |
| WO | 97/29162 A1 | 8/1997 |
| WO | 99/41324 A1 | 8/1999 |

* cited by examiner

Primary Examiner—Denise L. Esquivel
Assistant Examiner—Malik N. Drake
(74) Attorney, Agent, or Firm—Birch, Stewart, Kolasch & Birch, LLP

(57) ABSTRACT

A working medium is used which is composed of an R32 refrigerant or a mixed refrigerant containing at least 70 wt % of the R32 and a polyvinyl ether oil whose viscosity at 40° C. is 46–82 cst. Thus, a refrigeration system capable of improving COP while ensuring sufficient reliability using a working medium containing an R32 refrigerant having a low GWP (Global Warming Parameter) is provided.

2 Claims, 3 Drawing Sheets

VISCOSITY GRADE

VISCOSITY VISCOSITY GRADE [cst]

REFRIGERATING APPARATUS

This application is the national phase under 35 U.S.C. §371 of PCT International Application No. PCT/JP00/08140 which has an International filing date of Nov. 20, 2000, which designated the United States of America.

TECHNICAL FIELD

The present invention relates to a refrigeration system which uses a working medium containing an R32 (chemical formula: $CH_2F_2$) refrigerant.

BACKGROUND ART

For heat-pump refrigeration systems using a refrigerant, since HCFC-base refrigerants having larger ozone-depleting coefficients have became a target of CFC regulation, an R410A (R32:R125=50:50) refrigerant that is an HFC-base refrigerant having an ozone-depleting coefficient of zero is in use as an alternative refrigerant therefore. As refrigeration systems using the R410A refrigerant, indeed those capable of obtaining COP (Coefficient Of Performance) levels equivalent to that of an R22 refrigerant have been developed into products, but further improvement in COP is desired from the recent years' demand for energy saving. However, the R410A refrigerant has a problem that it cannot be improved in COP beyond the R22 refrigerant without increasing the size of the heat exchanger to thereby increase the amount of charged refrigerant with the resulting cost increased.

DISCLOSURE OF THE INVENTION

Therefore, an object of the present invention is to provide a refrigeration system capable of improving the COP while ensuring sufficient reliability by using a working medium containing an R32 refrigerant.

In order to achieve the above object, there is provided a refrigeration system which uses a working medium composed of an R32 refrigerant or a mixed refrigerant containing at least 70 wt % of the R32, and polyvinyl ether oil whose viscosity at 40° C. is 46–82 cst.

The present applicant has discovered through experiments that a favorable lubricity of the compressor, a sufficient reliability, and a high COP can be obtained, while global environmental problems are provided for, by using for the refrigeration system a working medium which consists of the low-GWP (Global Warming Parameter) R32 refrigerant free from ozone layer depletion or a mixed refrigerant containing at least 70 wt % of R32, and polyvinyl ether oil whose viscosity at 40° C. is 46–82 cst. Therefore, according to the refrigeration system having the above constitution, the COP of the system can be improved by lowering the viscosity at 40° C. of the polyvinyl ether oil used as refrigeration oil for the R32 refrigerant within a range of 46–82 cst that allows sufficient reliability to be obtained, and thereby improving the mechanical efficiency of the compressor., Further, by selecting a polyvinyl ether oil whose viscosity at 40° C. is low within the range of 46–82 cst as the refrigeration oil, the refrigeration system such as a split-type air conditioner having an indoor unit and an outdoor unit separately can be made larger in the high-low difference between the indoor unit and the outdoor unit, larger in the length of the connecting pipe that connects together the indoor unit and the outdoor unit, and further thinner in the diameter of the gas connecting pipe, as compared with systems using the R410A refrigerant or the R22 refrigerant.

In one embodiment of the present invention, the viscosity of the polyvinyl ether oil at 40° C. is 46–68 cst.

According to this embodiment, the COP of the system can be improved more reliably.

In one embodiment of the present invention, a. winding of a stator of a motor for a compressor is coated with an insulating layer of at least one selected from among crosslinked-polyethylene, polyvinyl formal, polyester, polyesterimide, polyamide and polyamide imide.

According to the refrigeration system of the above embodiment, by coating the winding of the stator of the motor for the compressor with an insulating layer of at least one selected from among crosslinked-polyethylene, polyvinyl formal, polyester, polyesterimide, polyamide and polyamide imide, weather resistance of the insulating layer is improved, high reliability can be obtained, and long-term service can be achieved.

In one embodiment of the present invention, at least one among an antifoaming agent, a moisture supplemental agent or an extreme pressure additive is added to the polyvinyl ether oil.

According to the refrigeration system of the above embodiment, by adding an antifoaming agent to the polyvinyl ether oil, foamability can be suppressed, and seizure of the compressor caused by suction of the refrigerant due to a foaming phenomenon can be prevented. Further, by adding a moisture supplemental agent to the polyvinyl ether oil, degradation in chemical reaction caused by an effect of moisture and freezing in portions of low temperatures can be prevented. Further, by adding an extreme pressure additive to the polyvinyl ether oil, a chemical adsorption film is formed on the sliding surface of the compressor so that the lubricity of the slidable portion can be improved.

In one embodiment of the present invention, the refrigeration system comprises a refrigerant circuit in which a compressor, a condenser, a decompressor, and an evaporator are connected in a loop, the refrigerating cycle having no dryer for eliminating moisture in the refrigerant.

According to the refrigeration system of the above embodiment, by using the polyvinyl ether oil resistant to moisture and less in degradation for the refrigeration oil, the dryer can be eliminated, allowing a cost reduction and downsizing of the system to be achieved.

Also, there is provided an air conditioner using a working medium composed of an R32 refrigerant or a mixed refrigerant containing at least 70 wt % of the R32 and polyvinyl ether oil whose viscosity at 40° C. is 46–82 cst, wherein the air conditioner has an indoor unit and an outdoor unit.

According to the air conditioner having this constitution, the high-low difference between the indoor unit and the outdoor unit can be increased, the length of the connecting pipes can be increased, and further the diameter of the gas connecting pipes can be narrowed, as compared with air conditioners using the R410A refrigerant or the R22 refrigerant.

BEST MODE FOR CARRYING OUT THE INVENTION

A refrigeration system of the present invention will be described in detail below with reference to illustrated embodiments.

Figure 1:
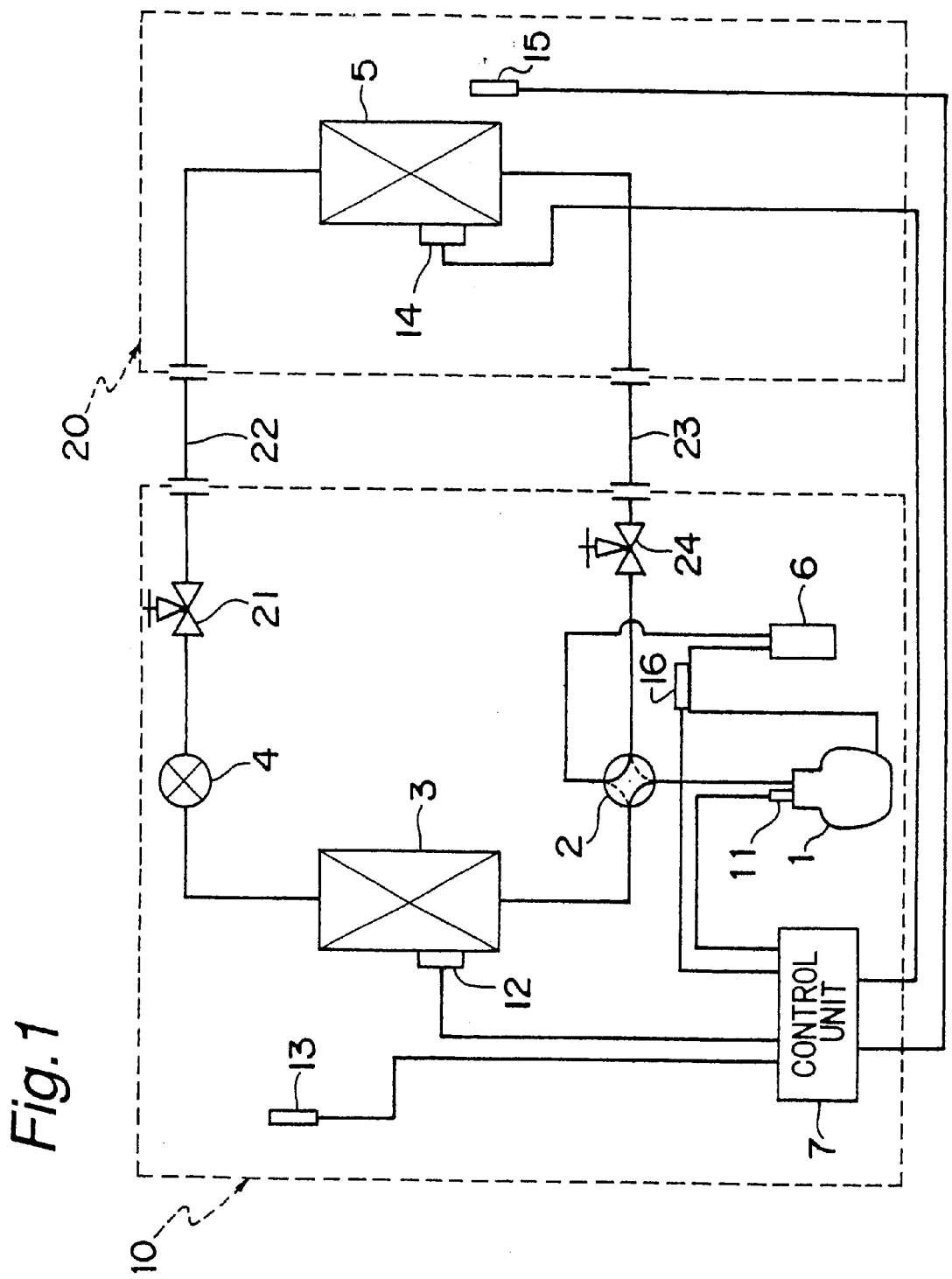
FIG. 1 is a circuit diagram showing a schematic configuration of an air conditioner as a refrigeration system according to an embodiment of the invention.

FIG. 1 is a circuit diagram showing a schematic configuration of a heat-pump air conditioner as a refrigeration system according to an embodiment of the invention, where reference numeral 1 denotes a compressor, numeral 2 denotes a four-pass switching valve one of whose ends is connected to the discharge side of the compressor 1, numeral 3 denotes an outdoor heat exchanger one of whose ends is connected to the other end of the four-pass switching valve 2, numeral 4 denotes a motor-driven expansion valve one of whose ends is connected to the other end of the outdoor heat exchanger 3, numeral 5 denotes an indoor heat exchanger one of whose ends is connected to the other end of the motor-driven expansion valve 4, and numeral 6 denotes an accumulator one of whose ends is connected to the other end of the indoor heat exchanger 5 through the four-pass switching valve 2 while the other end is connected to the suction side of the compressor 1. The air conditioner includes a temperature sensor 11 for detecting the discharge pipe temperature of the compressor 1, a temperature sensor 12 for detecting the refrigerant temperature of the outdoor heat exchanger 3, a temperature sensor 13 for detecting outside air temperature, a temperature sensor 14 for detecting the refrigerant temperature of the indoor heat exchanger 5, a temperature sensor 15 for detecting indoor temperature, a temperature sensor 16 for detecting the refrigerant temperature on the suction side of the compressor 1, and a control unit 7 for, upon receiving signals from the temperature sensors 11–16, controlling the compressor 1, the motor-driven expansion valve 4, and the like. In addition, a closing valve 21 is disposed between the motor-driven expansion valve 4 and the indoor heat exchanger 5, while a closing valve 24 is disposed between the indoor heat exchanger 5 and the four-pass switching valve 2.

An outdoor unit 10 is made up of the compressor 1, the four-pass switching valve 2, the outdoor heat exchanger 3, the motor-driven expansion valve 4, the accumulator 6, the control unit 7, the closing valve 21, the closing valve 24, the temperature sensors 11–13, the temperature sensor 16, and an outdoor fan (not shown), while an indoor unit 20 is made up of the indoor heat exchanger 5, the temperature sensor 14, the temperature sensor 15, and an indoor fan (not shown).

The air conditioner uses a working medium consisting of an R32 refrigerant or a mixed refrigerant containing at least 70 wt % of the R32, and polyvinyl ether oil (product model number: FV46–FV 82, made by Idemitsu Kosan) whose viscosity at 40° C. is 46–82 cst. In addition, centistokes [cst] is the unit of kinematic viscosity, which is expressed also in $mm^2/sec$. Also, the kinematic viscosity is measured with a glass capillary viscosimeter in conformance with a kinematic viscosity test method of JIS K2283-1983.

In the air conditioner of the above constitution, for air cooling operation, the four-pass switching valve 2 is switched to a switching position depicted in solid line, causing the compressor 1 to be activated, where a high-pressure refrigerant discharged from the compressor 1 enters the outdoor heat exchanger 3 through the four-pass switching valve 2. Then, the refrigerant condensed by the outdoor heat exchanger 3 is depressurized by the motor-driven expansion valve 4, and then enters the indoor heat exchanger 5 through a connecting pipe 22. The refrigerant that has evaporated at the indoor heat exchanger 5 returns to the suction side of the compressor 1 through a connecting pipe 23, the four-pass switching valve 2, and the accumulator 6. Thus, the working medium containing the R32 refrigerant circulates through a refrigerant circuit composed of the compressor 1, the outdoor heat exchanger 3, the motor-driven expansion valve 4, the indoor heat exchanger 5 and the accumulator 6, thereby performing a refrigerating cycle. Then, the indoor air is circulated by the indoor fan (not shown) through the indoor heat exchanger 5, thereby cooling the room interior.

Figure 2A:
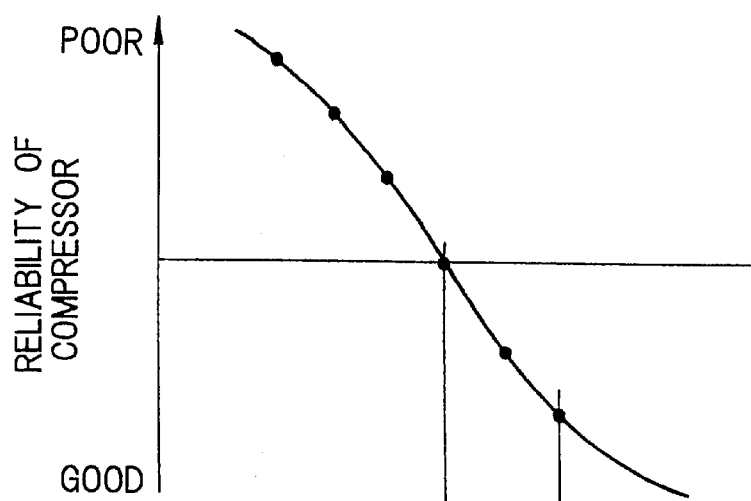
FIGS. 2A and 2B are drawings showing the reliability of a compressor and a system COP relative to the viscosity grade of polyvinyl ether oil in the air conditioner.
Figure 2B:
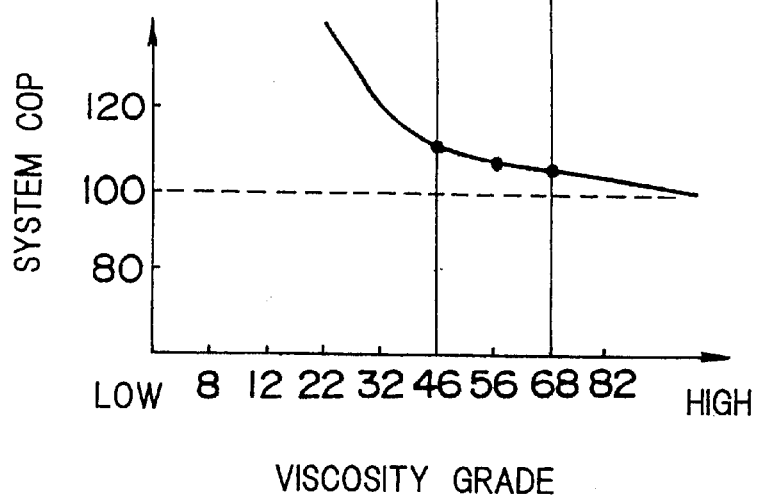

As a result of examining the reliability of the compressor and the COP (Coefficient Of Performance) of the system by changing the viscosity grade of the polyvinyl ether oil added to the R32 refrigerant, the present applicant has found that favorable properties can be obtained with the viscosity at 40° C. in a range of 46–82 cst as shown in FIGS. 2A and 2B. That is, FIG. 2A shows the reliability of the compressor relative to the viscosity grade, while FIG. 2B shows the COP ratio of this system to a system using R410A refrigerant relative to the viscosity grade. As shown in FIGS. 2A and 2B, when the viscosity at 40° C. is in the range of 46–82 cst, the reliability of the compressor is improved and moreover the COP ratio of the system is also improved as compared with the system using R410A refrigerant. More preferably, setting the viscosity at 40° C. of the polyvinyl ether oil to within a range of 46–68 cst allows the COP of the system to be securely improved. In addition, when mixed refrigerants containing at least 70 wt % of the R32 refrigerant is used, there is almost no difference in the improvement effects on the reliability of the compressor and the COP ratio of the system.

Figure 3A:
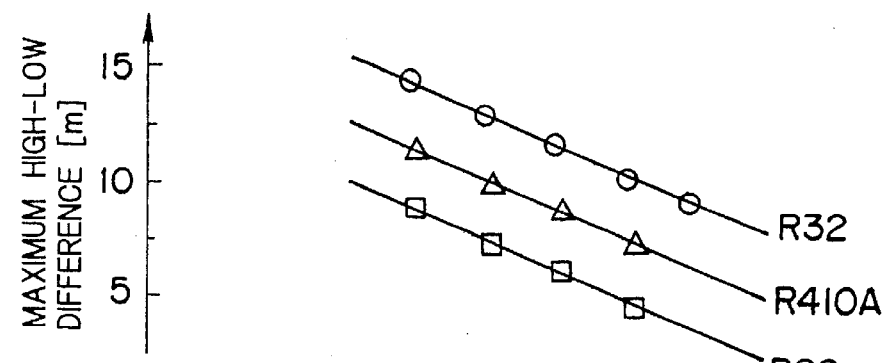
FIGS. 3A, 3B and 3C are drawings showing the high-low difference, the length of connecting pipes, and the diameter of gas connecting pipes relative to the viscosity grade of refrigeration oil with respect to R410A, R22, and R32 refrigerants.
Figure 3B:
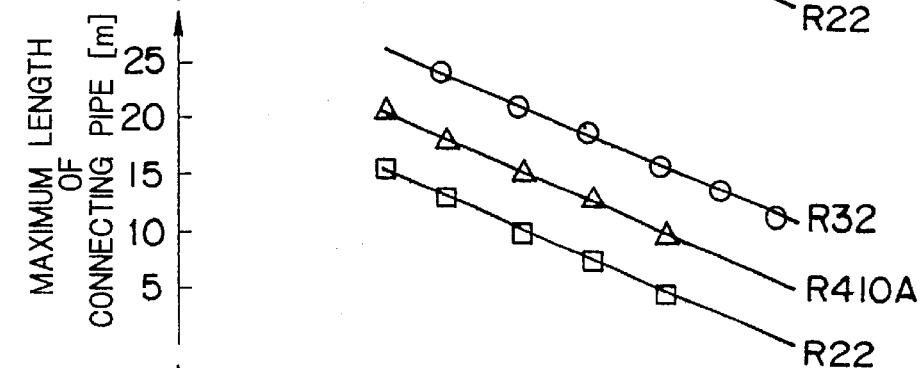
Figure 3C:
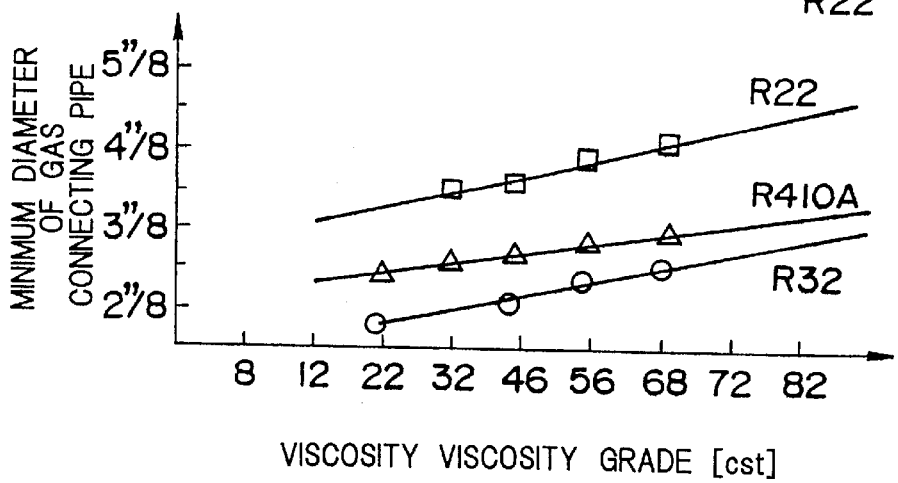

For comparisons among the R410A refrigerant, the R22 refrigerant and the R32 refrigerant, the high-low difference of the indoor unit and the outdoor unit, the length of the connecting pipe, and the diameter of the gas connecting pipe were examined by experiments with the viscosity grade of the refrigeration oils changed. In this case, the experiments were carried out by using polyvinyl ether oil (product model number: FVC, made by Idemitsu Kosan) as the refrigeration oil for the R410A refrigerant, Suniso oil as the refrigeration oil for the R22 refrigerant, and polyvinyl ether oil (FV) as the refrigeration oil for the R32 refrigerant, and with an air conditioner having a refrigeration power of 4–5 kW. As a result of the experiments, as shown in FIG. 3A that, among the R410A, R22 and R32 refrigerants, the maximum high-low difference between the indoor unit and the outdoor unit decreased with rising viscosity grade of the refrigeration oil, whereas the maximum high-low difference between the indoor unit and the outdoor unit in every viscosity grade of the R32 refrigerant was larger than those of the R410A and R22 refrigerants. Further, as shown in FIG. 3B, among the R410A, R22 and R32 refrigerants, the maximum length of the connecting pipe increased with lowering viscosity grade of the refrigeration oil, whereas the maximum length of the connecting pipe in every viscosity grade of the R32 refrigerant was larger than those of the R410A and R22 refrigerants. Further, as shown in FIG. 3C, among the R410A, R22 and the R32 refrigerants, the minimum diameter of the gas connecting pipe increased with rising viscosity grade of the refrigeration oil, whereas the minimum diameter of the gas connecting pipe in every viscosity grade of the R32 refrigerant was narrower than those of the R410A and R22 refrigerants.

Thus, there can be provided an air conditioner capable of obtaining sufficient reliability and high COP while global environment problems are dealt with, by using a working medium containing the R32 refrigerant having a low GWP (Global Warming Parameter).

In addition, by coating the winding of the stator of the motor for the compressor with an insulating layer of at least one selected from among crosslinked-polyethylene, polyvinyl formal, polyester, polyesterimide, polyamide and polyamide imide, weather resistance of the insulating layer is improved and high reliability can be obtained.

Further, by adding an antifoaming agent to the polyvinyl ether oil, foamability can be suppressed, and seizure of the compressor caused by suction of the refrigerant due to a foaming phenomenon can be prevented. Further, by adding a moisture supplemental agent to the polyvinyl ether oil, degradation in chemical reaction caused by an effect of moisture and freezing in portions of low temperatures can be prevented. Further, by adding an extreme pressure additive to the polyvinyl ether oil, a chemical adsorption film is formed on the sliding surface of the compressor by the extreme pressure additive so that the lubricity of the slidable portion can be improved.

Further, whereas using a dryer with the R32 for the purpose of eliminating moisture is quite difficult because of the R32's low molecular weight, using for the refrigeration oil the polyvinyl ether oil having a property of higher resistance to moisture than other synthetic oils such as ester oil allows an air conditioner without a dryer or with a small dryer to be realized.

Further, by selecting a polyvinyl ether oil whose viscosity at 40° C. is low within the range of 46–82 cst as the refrigeration oil, the high-low difference between the indoor unit 20 and the outdoor unit 10 can be increased, the connecting pipes 22, 23 which connect the indoor unit 20 and the outdoor unit 10 together can be elongated, and further the diameter of the gas connecting pipes can be narrowed, as compared with those using the R410A refrigerant or the R22 refrigerant.

Although the above embodiment has been described on an air conditioner as a refrigeration system, the present invention may also be applied to other refrigeration systems.

Further, although an air conditioner using the R32 refrigerant has been described as the refrigeration system in the above embodiment, yet the refrigerant to be used in the refrigeration system is not limited to this, and mixed refrigerants containing at least 70 wt % of the R32 may also be used. For example, a mixed refrigerant of the R32 refrigerant with $CO_2$, which is a mixed refrigerant containing not less than 70 wt % and not more than 90 wt % of the R32 against $CO_2$, or a mixed refrigerant of the R32 refrigerant and the R22 refrigerant, which is a mixed refrigerant containing not less than 70 wt % and not more than 90 wt % of the R32 against the R22 refrigerant may be used.

What is claimed is:

1. A refrigeration system which uses a working medium composed of a mixed refrigerant of R32 and $CO_2$ containing not less than 70 wt % and not more than 90 wt % of R32 compared to $CO_2$, and a polyvinyl ether oil having a viscosity at 40° C. of 46–82 cst.

2. A refrigeration system which uses a working medium composed of a mixed refrigerant of R32 and R22 containing not less than 70 wt % and not more than 90 wt % of R32 compared to R22, and a polyvinyl ether oil having a viscosity at 40° C. of 46–82 cst.

* * * * *